United States Patent [19]
Kline et al.

[11] Patent Number: 6,157,653
[45] Date of Patent: *Dec. 5, 2000

[54] METHOD AND APPARATUS FOR ADAPTIVE SMOOTHING DELAY FOR PACKET VOICE APPLICATIONS

[75] Inventors: Richard B. Kline, E. Walpole; Dennis Ng, Northboro, both of Mass.

[73] Assignee: Motorola Inc., Schuamburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/780,304

[22] Filed: Jan. 8, 1997

Related U.S. Application Data

[63] Continuation of application No. 08/123,822, Nov. 19, 1993, abandoned.

[51] Int. Cl.[7] ............................................. H04J 3/24
[52] U.S. Cl. .................. 370/412; 370/429; 704/201; 704/262
[58] Field of Search .................... 370/230, 231, 370/232, 235, 252, 389, 392, 394, 400, 401, 412, 415, 416, 428, 429, 516, 517; 340/825.06, 825.15, 825.18, 825.03, 826; 379/67, 88, 269, 271, 272; 704/200, 201, 219, 258, 262

[56] References Cited

U.S. PATENT DOCUMENTS

| | | | |
|---|---|---|---|
| 4,453,247 | 6/1984 | Suzuki et al. | 370/94.2 |
| 4,607,363 | 8/1986 | Platel et al. | 370/61 |
| 4,748,620 | 5/1988 | Adelmann et al. | 370/94.1 |
| 4,894,823 | 1/1990 | Adelmann et al. | 370/60 |
| 4,914,650 | 4/1990 | Sriram | 370/94.1 |
| 4,918,687 | 4/1990 | Bustini et al. | 370/61 |
| 5,148,429 | 9/1992 | Kudo et al. | 370/94.2 |
| 5,224,099 | 6/1993 | Corbalis et al. | 370/94.2 |
| 5,278,825 | 1/1994 | Wallmeier et al. | 370/60 |

OTHER PUBLICATIONS

"Draft Report on Voice Packetization", AT&T, Study Period 1993–1996, Telecommunications Standardization Sector, International Tellecommunications Union, pp. 1–13.

Montgomery, Warren A. "Techniques for Packet Voice Synchronization," IEEE Journal on selected areas in communications, vol. SAC–1, No. 6, Dec. 1983; Page # 1022–1028.

*Primary Examiner*—Alpus H. Hsu
*Attorney, Agent, or Firm*—J. Ray Wood; John Powell; Joanne N. Pappas

[57] ABSTRACT

A communication system transmits packetized voice data from a voice source to a voice destination. At the voice destination, the packets are accumulated in a buffer, sequentially played out and the time the packet waits in the buffer is monitored. The time future voice packets are played out is accordingly adjusted.

6 Claims, 4 Drawing Sheets

METHOD AND APPARATUS FOR ADAPTIVE SMOOTHING DELAY FOR PACKET VOICE APPLICATIONS

This is a continuation of application Ser. No. 08/123,822, filed Nov. 19, 1993 and now abandoned.

FIELD OF THE INVENTION

This invention relates to communication networks generally, and specifically to communication networks transporting packetized voice communication.

BACKGROUND OF THE INVENTION

Cell relay and fast packet switching are both switching methods for integrated communication networks. Such networks can carry diverse traffic types such as data, voice, CBR (constant bit rate), image and video traffic. Using a fast packet or cell relay mechanism, such as ATM (Asynchronous Transfer Mode), to switch different traffic types in the network, achieves integration of both transmission and switching resources.

Fast packet (FP) and cell relay (CR) networking technologies are very similar in nature and solve many networking problems. Both allow the construction of efficient and cost effective networks that carry diverse traffic types such as voice, video, CBR, and bursty data traffic. Both FP and CR networks convert (adapt) various types of traffic to a common format before transporting the traffic across the network. In both cases, the common form is a "small packet", where small is typically 64 or less octets. Each packet contains a network header containing destination or logical address, congestion level information, priority information, etc., and a payload portion containing the user's data.

The efficiency and diversity of CR and FP networks is obtained by the adaption of the traffic source, at the edge of the network, to a common form or packet. This allows network switches to handle the traffic in a common way inside each type of network independent of the source type.

However, this requires, at the source edge of the network, the adaptation of diverse traffic types to the common form, or packets. At the destination edge of the network, the packets need to be adapted back to the diverse original forms. These edge adaption procedures are traffic source type dependent. For example, CCITT (International Telegraph and Telephone Consultative Committee) AAL1 (ATM adaption layer 1) protocol, specified in CCITT draft recommendation I.363, is used for adaption of CBR traffic to ATM cells (packets), and CCITT AAL5 (ATM adaption layer 5) protocol, also specified in CCITT draft recommendation I.363, is used for adaption of HDLC (high level data link control) framed traffic to ATM cells.

"Packet networks" refers to either fast packet switching systems, or cell relay switching systems. "Packet voice" refers to voice which has been adapted to a form appropriate for a packet system.

Voice may be transported through a packet network as follows. The analog voice is first digitized and converted to 64 Kb/sec (kilobits per second) PCM (pulse code modulation). The resulting bit stream is optionally compressed using a voice compression algorithm, such as a 32 Kb/sec ADPCM coder (Adaptive Differential Pulse Code Modulation), or a 16 or 8 Kb/sec CELP coder (Code Excited Linear Predictor). The resulting bit stream is segmented into packets at the edge of the network by collecting bits for a time duration (denoted generally by "del_T"). A network packet header is attached to each voice packet. These packets are multiplexed with packets from other sources (both voice and non-voice) and are queued before transmission on internodal links in the network. At the destination edge, the voice is reconstructed by stripping the header and playing out the bits in the packet (may require optional decompression) at the nominal rate of the voice connection (typically 64 Kb/sec PCM).

Although the packets from a voice packet transmitter are generated at uniform intervals, spaced del_T time units apart, they do not arrive at the destination uniformly spaced due to different queuing delays that each individual packet encounters as it traverses the packet network. Since packets at the voice destination must be played out at uniform intervals, also spaced del_T time units apart, the variation in network queuing delay is compensated for by using a smoothing buffer at the voice packet receiver. When the initial (first) packet of a call arrives at the voice packet receiver, it is enqueued in the smoothing buffer and is not played out immediately. Instead, it is held in the smoothing buffer for a predetermined amount of time (referred to as the initial smoothing delay) before being dequeued and playout. After the first packet is played out, subsequent packets are played out at uniform time intervals (uniform spacing) of del_T time units. If the smoothing delay is chosen large enough, then the probability of a smoothing buffer underflow (i.e., a subsequent packet arrives too late to be played out) for subsequent packets is negligible.

The smoothing delay should be kept at an absolute minimum for two reasons. First, the smoothing buffer at the destination receiver is finite. Therefore, buffer overflow should be avoided. Second, for voice applications, the total "end-to-end" delay is perceivable by network users If the total delay of the voice path exceeds 200 milliseconds, the telephone conversation may be perceived (by the two parties having a conversation) as being a "long distance connection". Thus, the total end-to-end delay should be less than 200 milliseconds.

Further, observed network delay and packet jitter characteristics may change rapidly over time ( as other connections are set up and taken down in the network). Therefore, the mechanism must be robust and capable of adjusting the smoothing delay to minimize the total end-to-end delay while preventing smoothing buffer underflows, and also compensate for any other network delay irregularities.

Thus, a smoothing delay mechanism which provides a simple method to control smoothing buffer underflows at the destination edge of a voice connection in a fast packet network, provides a simple mechanism to minimize the smoothing delay value, adapts to changing network delay characteristics, adjusts for clock drift between sending and receiving nodes and is robust to other network impairments, such as dropped packets, bit errors, packets falsely inserted into the voice channel from other sources, is desirable.

DESCRIPTION OF THE PREFERRED EMBODIMENT

A smoothing delay mechanism with such desirable characteristics includes several components.

First, at call establishment time, the required smoothing delay is calculated by the connection control, routing subsystem. The required worst case smoothing delay varies call by call depending upon the specific path assigned to the call, but is known for a specific call once the path map of the call is known. For example, the worst case smoothing delay required is the sum of the individual worst case delays for all the queues that the call traverses. Other specific statistical worst cases can be calculated for calls that traverse many inter-nodal queues.

Second, the enqueuing process at the packet receiver attaches a "received" time stamp at the instant that the packet is received at the receiver. It is not necessary to synchronize said time stamp with the packet transmitter (i.e., across the network). It will be demonstrated that the time stamp has local significance only, and there is no need for an "absolute" clock.

Third, at play out, the packet voice receiver, upon dequeuing the packet from the smoothing buffer, calculates the waiting time of the packet, which is defined as the total amount of time that the packet spent in the smoothing buffer. The waiting time of each packet is calculated by subtracting the received time stamp, attached to the packet in the previous step, from the packet receiver's local timer at the time instant that the packet is played out. The voice packet receiver also creates a histogram of receive packet waiting times.

Finally, the histogram is periodically analyzed to compare the actual queuing delays encountered by the voice packets with the expected queuing delays, and then the smoothing delay is adaptively adjusted to obtain the minimum possible delay for the call.

Figure 1:
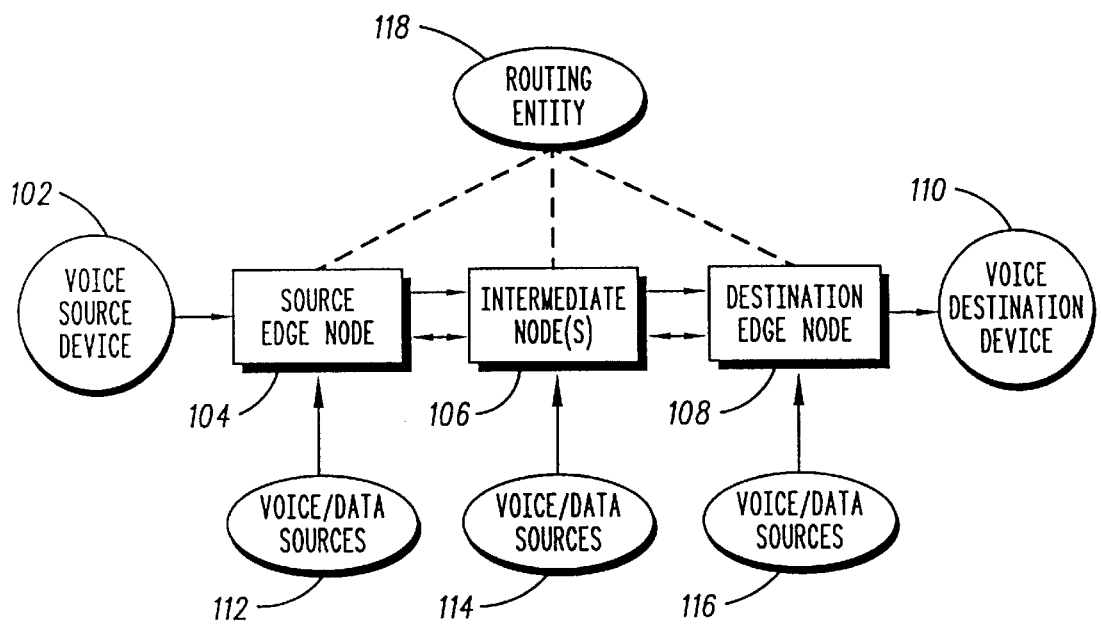
FIG. 1 is a general packet network.

Network 100, shown in FIG. 1, is a generalized representation of a voice call in a packet network. Packet networks in use may be more complicated than that shown in FIG. 1. Network 100 consists of source edge node 104, intermediate packet switching nodes 106 and destination edge node 108. Generally, voice and data networks consist of many source nodes, intermediate nodes and destination nodes. The nodes are geographically distributed, but operably connected through internodal communication links. Voice source 102 is operably connected to edge node 104. Edge node 104 converts the voice signal from the voice source to voice packets and sends voice packets through network 100 to the destination edge node 108. Destination edge node 108 converts voice packets back to a voice signal or original (or equivalent) form and sends resulting voice signal to voice destination device 110 which is operably connected to edge node 108. FIG. 1 illustrates the path from voice source device 102 to voice destination device 110. Typically, there would be a reverse path allowing voice communication from device 110 to 102. The reverse path is not shown in FIG. 1, but is an obvious extension of the above.

Voice packets, traversing network 100 from source edge node 104 to destination edge node 108 follow a specific path through network. The path may include multiple intermediate nodes 106. The path is fixed at call establishment time (the beginning of the voice call) by a routing entity 118 in network 100. Routing entity 118 may be either distributed or centralized, but in either case, it is capable of finding an acceptable path, if one exists, from source edge node 104, through the network 100 to destination edge node 108. After finding the path, routing entity 108 has knowledge of the transmission characteristics of the call, such as expected delay (i.e., how long it will take for packets to traverse from source node 104 to destination node 108) and worst case queuing jitter (i.e., how much the delay varies for different packets.).

Figure 2:
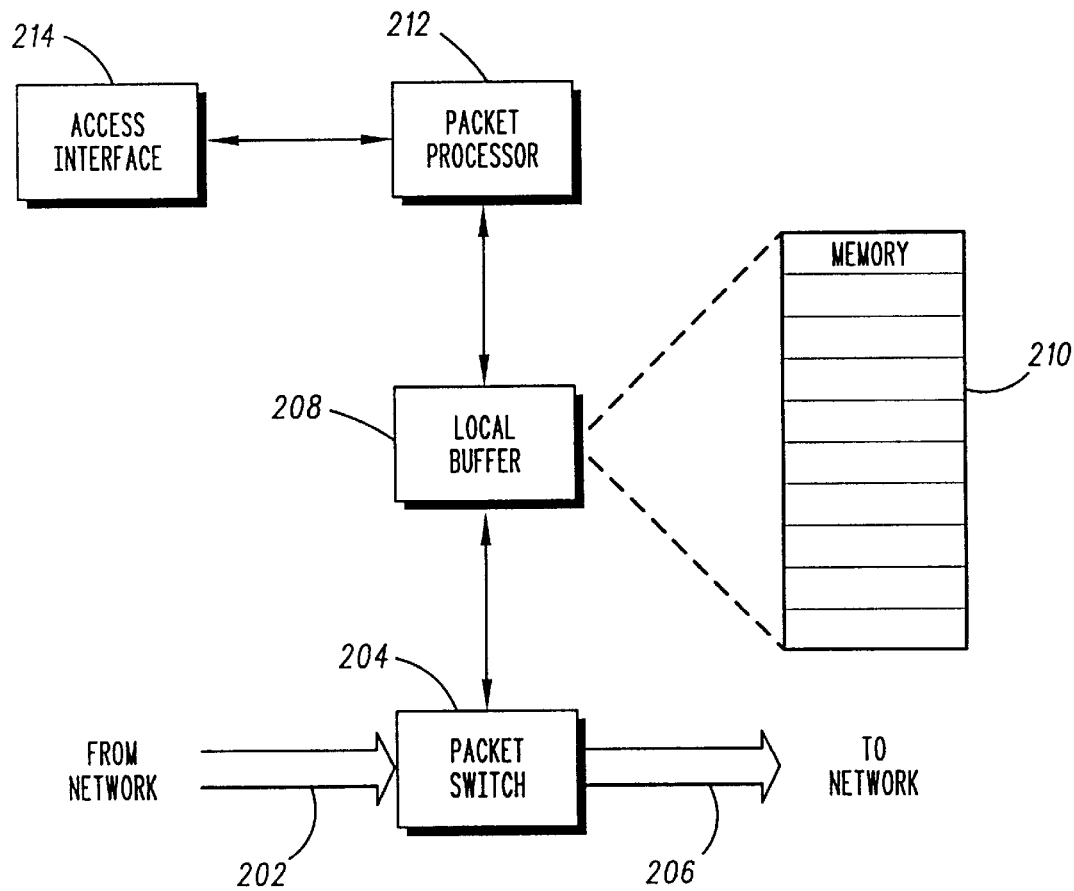
FIG. 2 is a node in packet network.

FIG. 2 contains a general depiction of a node 200. The node could be source edge node 104, intermediate node 106, or destination edge node 108. A node receives packets on one or more receive internodal links 202 from other nodes in network 100. The packet switch 204 in node 200 examines address information in each received packet, and temporarily stores the packet in an appropriate queue in local buffer 208. Local buffer 208 is operably connected to both packet processor 212 and packet switch 204. Packets may be directed to/from local buffer by either packet processor 212, or by packet switch 204. Packet processor 212 may direct packets to buffer 208 for subsequent transmission on one or more internodal links 206 by packet switch 204, or for other purposes. Similarly, packet switch 204 may direct packets to buffer 208 for subsequent packet processing by packet processor 212, or for subsequent transmission on one of a possible plurality of internodal links 206, or for other purposes.

Local buffer 208 may be a single centralized memory, or else, a distributed memory within the node, but consists of one or more memories which are partitioned appropriately to store packets 210 until needed. Packet processor 212 may consists of a single centralized processor, or a plurality of distributed packet processors.

Packet processor 212 is also operably connected to a plurality of voice and data sources through a plurality of access interfaces 214. Packet processor 212 receives voice (or data) from sources through access interface 214, performs adaptions on the received voice (or data) to convert voice (or data) to packets, and then directs packets to local buffer 208 for subsequent transmission on internodal links 206. Similarly, packets received on internodal links 202 and stored in local buffer 208 by packet switch 204, may be subsequently removed by packet processor 212 and converted from packet form to the original form compatible with source (voice or data) and directed to access interface(s) 214. Voice and data source devices that may be connected to access interface(s) 214 such terminals, LANs (local area networks), modems, PBXs (Private Branch Exchange), and telephones.

In voice applications, packet processor 212 is a voice packet processor. Furthermore, the processing performed by voice packet processor 212 which occurs in the direction from the access interface 214 towards the network is packet voice transmit operations (PVT). The processing which occurs in the direction from the network to the access interface 214 is the packet voice receiver (PVR).

Figure 3:
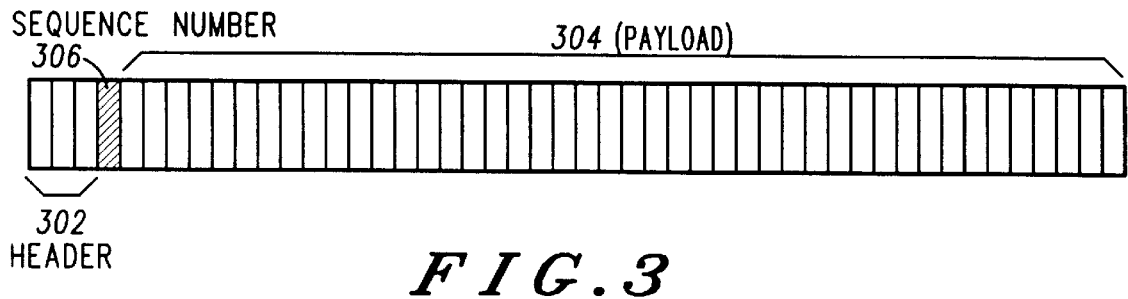
FIG. 3 is a voice packet.

FIG. 3 shows packet 300. Packet 300 is a series of bytes. Packet 300 has header 302 and payload 304. Header 302, shown with three bytes, contains information used by nodes 104, 106, 108 to relay packet 300 to its destination. Payload 304, here shown with 44 bytes, contains data and information related to the voice source. Part of payload 304 is sequence number 306. Sequence number 306 is assigned by voice packet processor 212. Each successive voice packet is assigned a successive sequence number 306.

Packetization of voice by voice packet processor 212 consists of accumulating voice samples from voice source 102 operably connected to voice packet processor 212 through access interface 214. After a sufficient number of samples have been accumulated, the voice samples may be compressed by the voice packet processor 212 and placed in payload 304 along with sequence number 306. Header 302, containing a connection identifier for fast packet 300, is attached by the voice packet processor 212 to payload 304 for use in relaying fast packet 300 to its destination 108 within network 100.

Packets are transmitted, by voice packet processor 212 at the source edge node 104 at uniformly spaced intervals of del_T time units. Each successive sequence number 306 in voice packet 300 represents a change in time of del_T units. Since the packet voice processor 212 at the destination edge node 108 also dequeues packets at uniformly spaced time intervals of del_T time units, sequence number 306 may be used to determine the relative time that each packet is to be played out (dequeued). Therefore, sequence number 306 serves as a time stamp, indicating the relative playout time of received packets at the PVR, and a sequence number, for detecting packets lost by packet network 100.

The dual purpose of the sequence number is true when the voice packet processor includes a voice activity detection mechanism. In this case, the PVT detects the presence or absence of voice (so called talkspurts), and only sends packets when it detects the presence of active speech signals in the audio channel. Thus, the PVT will send packets uniformly space by del_T units of time during a talk spurt, but will not send packets during silence intervals. However, the PVT keeps incrementing the sequence number at the same del_T time increments even during silence intervals when no packets are sent. Thus, when the next talkspurt occurs, the transmitted packets will contain sequence numbers that correspond to the expected relative playout times at the PVR. Thus, the PVR can continue to use the sequence number in the voice packets as a time stamp and a sequence number.

Referring once again to FIG. 1, source edge node 104 is shown coupled to voice source 102. Voice source 102 may be a telephone, PBX, or any other device that generates voice signals.

Source edge node 104 contains packet processor 212 which converts voice signal to packet form, and then enqueues packet in buffer 208 for subsequent transmission on a specific internodal link (in case there are a plurality of internodal links 206). The enqueued voice packets must contend with packets from other voice and data sources 112 for transmission in network 100. The voice packets are transmitted via packet switch 204 to intermediate node 106. While one intermediate node 106 is shown, a plurality (but possibly, zero) of intermediate nodes may be in the path from source edge node 104 to destination edge node 108 for a specific voice call. As the packet of a voice call travels along the specific path associated with the call, in encounters a plurality of such queues. Each encountered queue increases the expected queuing jitter which will be observed by the PVR (212) at the destination edge node 108.

At intermediate node(s) 106, the voice packets are again enqueued for transmission with other voice and data packets from other sources and other internodal links. The voice packets associated with the said voice call are transmitted along the path towards the destination edge node 108.

At destination edge node 108, the voice packets are directed to the local buffer 208 and the (voice) packet processor 212 removes the voice packets and converts the voice packets to a form compatible with the voice destination device 110. The process of removing the voice packets from the local buffer 208, converting the voice packet from packet form to a voice signal compatible with the voice destination device 110 is referred to as the voice playout process. The exact time instance when this process occurs for a specific voice packet is referred to as the playout time of the said packet.

A portion of buffer 208 is set aside as a voice packet receive buffer for the voice packet processor 212. Playout is accomplished by placing the packets in the voice packet buffer (enqueuing) and, at a later time, retrieving the packets from the voice packet buffer (dequeuing) before converting packet to original voice signal and playing out the voice signal to the voice destination device 110. The voice packet buffer is referred to as the smoothing buffer.

Figure 4:
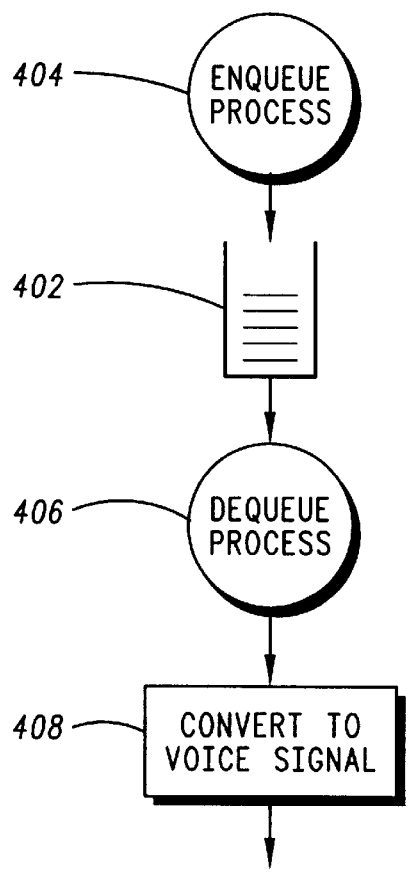
FIG. 4 is voice playout process

The smoothing buffer 402, along with the enqueue 404, dequeue 406, and packet conversion 408 processes are illustrated in FIG. 4. Packets are inserted in smoothing buffer 402 by an enqueue process 404 and removed from the buffer by a dequeue process 406. The process described herein simultaneously minimizes the waiting time that packets spend in the smoothing buffer before being dequeued and converted to original form, minimizing the probability of FIFO (First In, First Out) underflow, and also preserves the exact spacing between talkspurts. This is accomplished by the following method:

At the voice packet processor 212 in the source edge node 104, hereafter referred to as the PVT (packet voice transmitter), sequence number 306 is included in each voice packet 300. Sequence number 306 allows the voice packet processor 212 in the destination node 108, hereafter referred to as the PVR (packet voice receiver), to detect when a packet has been dropped by the network. Packets are marked with a sequence number that is incremented for each successive fast packet, and which wraps around to zero after reaching some maximum. For example, if PVR receives sequence numbers 1-2-3-5-6, it can discern that packet number 4 is missing. The PVT will send a continuous stream of uniformly spaced packets. If at the PVR, a sequence number 306 is found to be missing, the packet receiver knows that the packet was dropped by the network, and will therefore interpolate the speech to fill in the audio channel for the missing packet.

The number of bits required to represent the sequence number 306 in each voice packet is determined by the time interval between packet transmissions, del_T, and the worst case smoothing delay that one needs to compensate for the queuing jitter that voice packets experience as they traverse the packet network from source edge node 104 to destination edge node 108. To unambiguously span the worst case queuing jitter at the receiver, the time span of the sequence number 306 (i.e., how often the modulo counter reset to zero) must be greater than the queuing timing jitter.

For example, if del_T is chosen to be 5 milliseconds, or equivalently 40 voice samples (bytes) per voice packet, if PCM (pulse code modulation) encoding is used by the PVT, and if the sequence number 306 was allocated 6 bits (i.e. 64 counts) in the voice packet, then the sequence number 306 rolls over every 64*5=320 milliseconds, which is much larger than the worst case queuing jitter (typically 100 milliseconds, or less, for packet voice connections).

Figure 5:
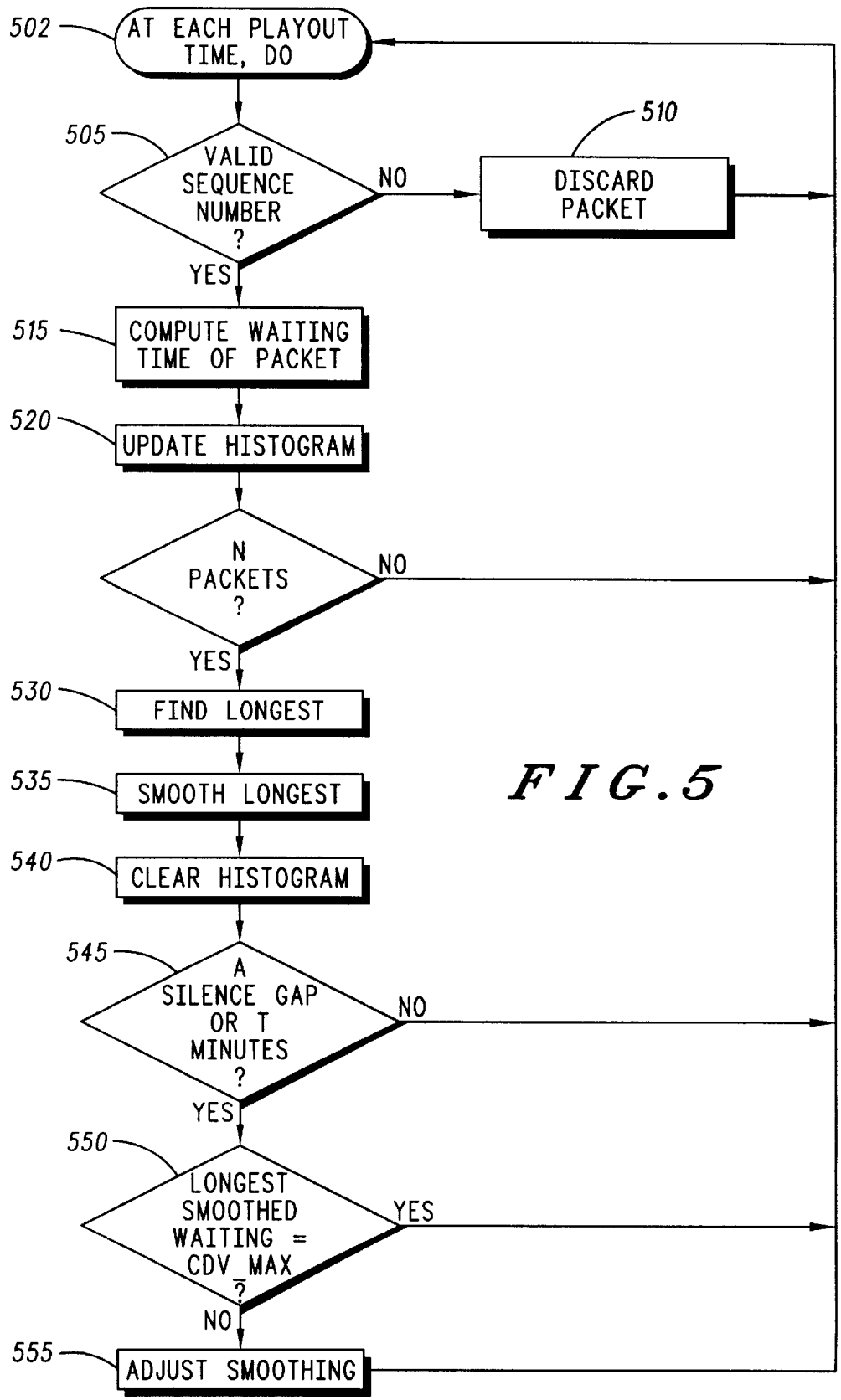
FIG. 5 is a flowchart of the adaptive smoothing delay process.

FIG. 5 shows a flowchart of the adaptive smoothing delay process 500. Each time a voice packet playout occurs (step 502), the sequence number 306 of the voice packet is checked (step 505). If the sequence number is not valid, the packet is discarded (step 510), and the next packet (if there is one) is examined (step 502). If the sequence number is valid, the packet is playout and the waiting time of the packet is computed (step 515), where the waiting time is defined as the difference between the time instance that the packet was enqueued into the smoothing buffer and the time that the packet was dequeue from the smoothing buffer. A histogram of waiting times is then updated (step 520).

After every N'th packet is played out, the histogram is post processed to find the longest waiting delay (step 530), the longest delay is smoothed (step 535), the histogram is cleared (step 540) in preparation for calculation of a new histogram over the next N packets. The parameter N is chosen to equal a fixed time interval (typically seconds).

If there is either a silence gap in the speech or if a predetermined time "T" (typically minutes) has elapsed (step 545), then the longest smoothed waiting time is compared with the maximum expected waiting time, CDV_Max (step 550). If the two are equal, then the smoothing delay is set at the optimum value, and no adjustment to the playout process is required.

If the two are not equal, then the playout time of the next received packet (and the playout times of subsequent packets) is adaptively adjusted such that the expected value of subsequent measured longest waiting times is equal to CDV_max (step 555).

Quantitatively, the i'th voice packet arrives at the destination after a time period equal to d(i). It is possible to break d(i) into two parts, d_fixed and d_var(i).

$$d(i)=d\_fixed+d\_var(i) \quad\quad (\text{Eq 1})$$

where
  d_fixed=the fixed transmission delay (the same for each packet) and
  d_var(i)=the queuing delay experienced by the i'th packet.

For a specific call (i.e. a specific path through the network) the variable portion of the delay, d_var(i) can be assumed to be bounded between 0 and some maximum known value which we will refer to as the maximum cell delay variation, CDV_max. The value of CDV_max may be either a known network wide parameter, or alternatively, it can be calculated by routing entity 118 on a call by call basis (i.e. known for the specific path chosen by the routing entity at call establishment time)

$$0<d\_var(i)<CDV\_max \quad\quad (\text{Eq 2})$$

Figure 6:
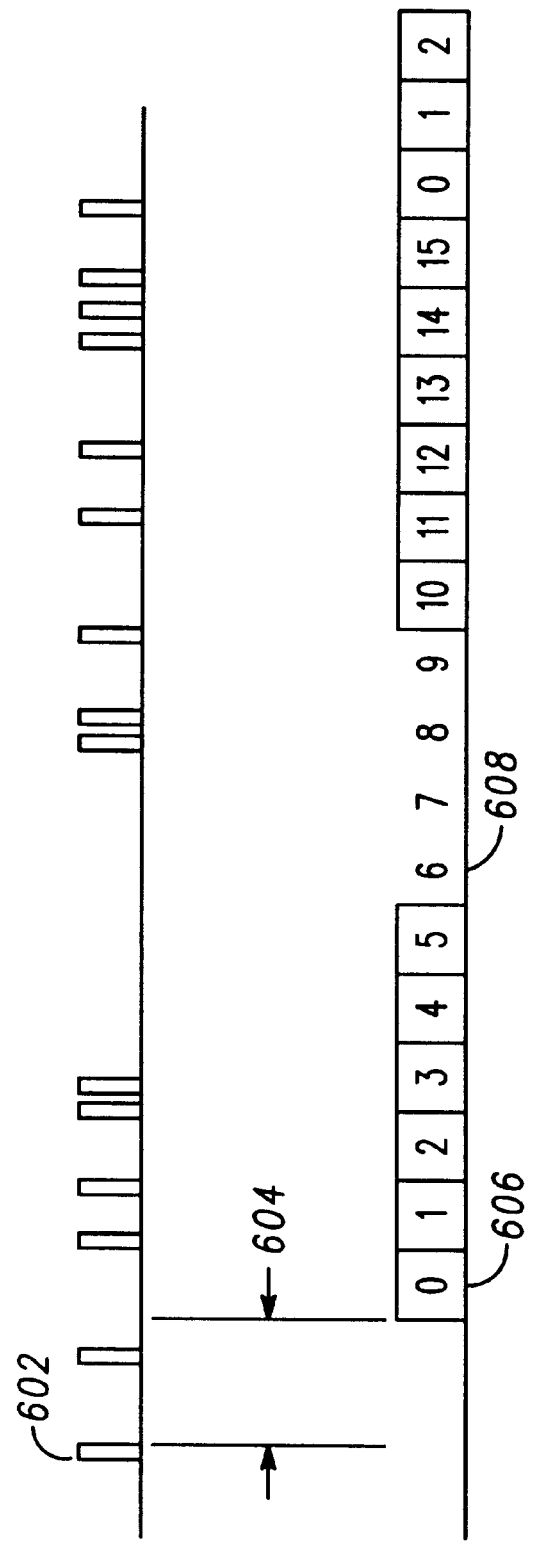
FIG. 6 is the Voice Packet Playout Process

FIG. 6 illustrates voice packet playout process 600 and the received packets 602, illustrating the typical time jitter experienced by the individual packets. The packets are not uniformly space in time (like they were at the output of the PVT 212). When the PVR 212 receives the packet, the enqueuing process 404 attaches a received time stamp to the packet.

Consider the following scenario illustrated in FIG. 6. When the first packet 602 of a call is received, the packet receiver applies an initial smoothing delay 604 equal to CDV_max. After the initial smoothing delay expires, the packet receiver plays out the first voice packet (i.e., converts the voice packet to original form 606). The packet receiver is then executed one "packet" time (del_T) later. When executed, the PVR searches the smoothing buffer 402 for a packet with the next expected sequence number. If found, then that packet is played out. If no such sequence number is found, then it either interpolates the speech in the audio channel (if the packet was dropped by the network) or else plays out silence 608 if the last packet was the end of a talkspurt.

The following end to end delay performance analysis applies to the above mode of operation.

Let t(i) denote the transmission time of the i'th packet.

$$t(i)=del\_T*i \quad\quad (\text{Eq 3})$$

where del_T is the time between (possible) packet transmissions (a time slotted system). If follows that the packet reception time at the destination is given by $$r(i)=t(i)+d(i) \quad\quad (\text{Eq 4})$$

where d(i) is given in equation 1 above. Therefore, substituting equation 1 and 3 into equation 4:

$$r(i)=del\_T*i+d\_fixed+d\_var(i) \quad\quad (\text{Eq 5})$$

Note that r(i) is the "enqueuing timing" of the i'th packet at the packet receiver.

Let p(i) denote the play out time of the i'th packet. Since a voice packet is played out every del_T time period, the playout time of the i'th packet can be expressed as:

$$p(i)=del\_T*i+p(0) \quad\quad (\text{Eq 6})$$

where p(0) is the play out time of the first packet which is given by:

$$p(0)=r(0)+CDV\_max \quad\quad (\text{Eq 7})$$

where CDV_max is the build out delay applied to the first packet before playing out the first packet (refer to FIG. 6)

Therefore, the play out time of the i'th packet can be expressed as (substitute Eq 7 into 6)

$$p(i)=del\_T*i+r(0)+CDV\_max \quad\quad (\text{Eq 8})$$

or equivalently (substituting Eq 5, with i=0, into 8)

$$p(i)=del\_T*i+d\_fixed+d\_var(0)+CDV\_max \quad\quad (\text{Eq 9})$$

Note that p(i) is the "dequeuing time" of the i'th packet.

Finally, the waiting time, defined as the time duration that the i'th packet spends in the smoothing delay buffer 402 can be expressed as the difference of the play out time (dequeue time) ( equation 9) and the packet arrival time (enqueue time) (equation 5):

$$w(i)=p(i)-r(i) \quad\quad (\text{Eq 10})$$

or equivalently $$w(i)=d\_var(0)+CDV\_max-d\_var(i) \quad\quad (\text{Eq 11})$$

Since both d_var(i) and d_var(0) are bounded by the closed interval (0, CDV_max) (Equation 2), the waiting time of all packets depends explicitly on d_var(0), which is the queuing jitter that the first packet experienced when it traversed the network.

If d_var(0), the variable portion of the delay of the first received packet, is equal to 0, then the waiting time w(i) is given by:

$$w(i)=CDV\_max-d\_var(i) \quad\quad (\text{Eq 12})$$

Since d_var(i) is bounded by the closed interval (0, CDV_max), refer to equation 2, it follows that the waiting time varies from 0 to CDV_max, which is the best that one can do. However, if d_var(0), the variable portion of the delay of the first received packet, is equal to the maximum value CDV_max, then, substituting d_var(0)=CDV_max into equation 11 yields $$w(i)=2*CDV\_max-d\_var(i) \quad\quad (\text{Eq 13})$$

Since d_var(i) is bounded by the closed interval (0, CDV_max), refer to equation 2, it follows that the waiting time for this case varies from CDV_max to 2*CDV_max. This means that the voice path will be delayed by an addition CDV_max time duration.

As explained previously, the present invention solves the above problem by adding the following adaptive loop to the smoothing delay algorithm. The algorithm is initialized by adding a build out delay, equal to CDV_max to the first packet received before playing the first packet out as described above and shown in FIG. 6. Subsequent packets are played out according to Eq 6 above (for the first few seconds—typically 2 seconds). However, for the subsequent packets, the following algorithm is used to adaptively adjust the smoothing delay (note: the following pseudo code is functionally equivalent to the flowchart contained in FIG. 5):

```
for each voice packet received with valid sequence number
{
    playout the packet at time p(i),
    compute the waiting delay w(i),
    where w(i) is defined to be the time difference between the
        enqueue and dequeue time instances for each packet.
    Update a histogram of waiting times, if N packets have
        been received, then
    {
        post process the histogram to find the longest valid
            waiting time,
        smooth the measured longest waiting time,
        and clear the histogram and begin compiling a new
            histogram over the next N voice packets.
    }
    if a silence gap exists in the speech,
    or a time period of T minutes exists with no silence gap,
        then do the following:
    {
        if the longest smoothed measured waiting time is not
            equal
        to the CDV_max value, then do the following
        {
            make a timing adjustment to the playout time
            of future voice packets such that the expected
            value of future longest waiting time is equal to
                CDV_max.
        }
    }
}
```

The above algorithm adjusts the smoothing delay to the optimum value, where the waiting times are bounded by the closed interval (0, . . . CDV_max). The algorithm will also compensate for clock drift between the source and destination nodes, and provide robustness during network re-routes.

While the method described above specifically refers to voice packets, the method could easily be used for any packetized data traffic, such as constant bit rate traffic or asynchronous data traffic.

We claim:

1. In a network having a voice packet receiver and a voice packet transmitter, a method of playing out a plurality of voice packets originating from the voice packet transmitter, the method comprising the steps of:

receiving and accumulating voice packets in a buffer of the voice packet receiver;

checking sequence number of each voice packet to be played out for validity;

sequentially and periodically playing out the voice packets from the buffer, each buffer being played out at a playout time that depends on a smoothing delay, controllable by the voice packet receiver;

determining waiting times for each of the voice packets received and accumulated in the buffer, the waiting time for each voice packet to be played out being the amount of time between when a voice packet is enqued in the buffer and the time that the same packet is dequed from the buffer;

constructing a histogram of the waiting times that each packet spends in the buffer; and adjusting the smoothing delay in response to the determined waiting times, wherein said step of adjusting the smoothing delay analyzes the histogram to determine an amount of smoothing delay necessary to compensate for queuing jitter actually experienced by the network and adjusts the smoothing delay to the necessary amount.

2. The method of claim 1 including the step of determining from the waiting time the maximum amount of queuing jitter actually experienced by the network.

3. The method of claim 1, including the step of determining from the waiting time the maximum amount of queuing jitter.

4. The method of claim 1 including the step of determining, for the plurality of voice packets, the maximum waiting time one of said packets spent in the buffer.

5. The method of claim 1 wherein the determining and adjusting steps are periodically re-initialized so that a new smoothing delay may be determined.

6. The method of claim 1 wherein the histogram is periodically cleared so that a new histogram of waiting times may be constructed and so that a new smoothing delay may be determined.

* * * * *